US011610596B2

(12) United States Patent
Chao et al.

(10) Patent No.: US 11,610,596 B2
(45) Date of Patent: Mar. 21, 2023

(54) ADJUSTMENT METHOD OF SOUND OUTPUT AND ELECTRONIC DEVICE PERFORMING THE SAME

(71) Applicant: Airoha Technology Corp., Hsinchu (TW)

(72) Inventors: Kuan-Li Chao, Taipei (TW); Wei-Ren Lan, Taipei (TW); Hung Lin, Taipei (TW); Kuo-Ping Yang, Taipei (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 274 days.

(21) Appl. No.: 17/023,435

(22) Filed: Sep. 17, 2020

(65) Prior Publication Data

US 2022/0084533 A1 Mar. 17, 2022

(51) Int. Cl.
*G10L 21/007* (2013.01)
*G10L 15/22* (2006.01)
*G10L 25/78* (2013.01)

(52) U.S. Cl.
CPC ............ *G10L 21/007* (2013.01); *G10L 15/22* (2013.01); *G10L 25/78* (2013.01)

(58) Field of Classification Search
CPC ......... G10L 21/07; G10L 21/00; G10L 21/03; G10L 21/043; G10L 21/057; G10L 2021/0575; G10L 2021/065; G10L 25/78; G10L 25/00; G10L 25/27; G10L 25/30; G10L 25/48; G10L 25/75; G10L 25/81; G10L 25/84; G10L 25/87; G10L 25/93; G10L 25/935; G10L 21/007

USPC ................ 704/246, 250, 214, 225, 272, 278
See application file for complete search history.

(56) References Cited

U.S. PATENT DOCUMENTS

| 2004/0176949 | A1* | 9/2004 | Wenndt | G10L 25/93 |
| | | | | 704/203 |
| 2012/0150544 | A1* | 6/2012 | McLoughlin | G10L 21/0364 |
| | | | | 704/262 |
| 2018/0040338 | A1 | 2/2018 | Schiro | |
| 2019/0189145 | A1* | 6/2019 | Rakshit | G06F 40/58 |
| 2021/0050029 | A1* | 2/2021 | Kleinberger | H04R 3/04 |
| 2021/0150544 | A1* | 5/2021 | Nakazato | G06Q 30/02 |

FOREIGN PATENT DOCUMENTS

| CN | 102547543 A | 7/2012 |
| CN | 110070863 A | 7/2019 |

\* cited by examiner

*Primary Examiner* — Qi Han
(74) *Attorney, Agent, or Firm* — McClure, Qualey & Rodack, LLP

(57) ABSTRACT

An adjustment method of sound output is disclosed. The adjustment method includes the following steps of: receiving an audio message having a vowel message; determining whether the audio message is a whispered voice message; if the audio message is a whispered voice message, outputting a normal voice message, wherein the spoken content of the normal voice message is the same as that of the audio message, and the normal voice message has a normal voice vowel message, wherein the sound energy of the low-frequency part of the normal voice vowel message is 1.5-1,000,000 times that of the vowel message.

18 Claims, 5 Drawing Sheets

US 11,610,596 B2

ADJUSTMENT METHOD OF SOUND OUTPUT AND ELECTRONIC DEVICE PERFORMING THE SAME

BACKGROUND OF THE INVENTION

1. Field of the Invention

The present invention relates to an adjustment method of sound output and an electronic device performing the adjustment method, and in particular to a method for adjusting a sound of a whispered voice message and an electronic device performing the same.

2. Description of Related Art

Sometimes and for some reasons, such as in a meeting, we have to answer the phone in a low voice to avoid interrupting the meeting. However, when the speaker speaks in a whisper, the listener will not be able to hear clearly, resulting in difficulties and inconvenience in dialogue. In addition, in some cases, when a person speaks in a whisper to a hearing-impaired person with a hearing aid, the hearing-impaired person will not be able to hear the content of the speech clearly, causing trouble to the hearing-impaired person.

Therefore, it is necessary to invent a method to adjust the sound output in order to solve the aforementioned deficiencies.

SUMMARY OF THE INVENTION

The main object of the present invention is to provide a method for adjusting a sound output of a whispered voice.

Another main object of the present invention is to provide an electronic device for performing the above adjustment method.

In order to achieve the above objects, the adjustment method of sound output of the present invention is applied to an electronic device. The adjustment method of sound output of the present invention comprises the following steps: receiving an audio message, which comprises a vowel message; determining whether the audio message is a whispered voice message; if the received audio message is a whispered voice message, outputting a normal voice message, wherein the normal voice message has the same voice content as the audio message and comprises a normal voice vowel message, and the sound energy of the low-frequency part of the normal voice vowel message is 1.5-1,000,000 times that of the low-frequency part of the vowel message.

The electronic device of the present invention comprises a signal receiving terminal and a processing unit, wherein the processing unit is coupled to the signal receiving terminal. The signal receiving terminal is used for receiving an audio message, wherein the audio message comprises a vowel message. The processing unit is used for determining whether the audio message is a whispered voice message, and when the audio message is a whispered voice message, the processing unit outputs a normal voice message, wherein the normal voice message has the same voice content as the audio message and comprises a normal voice vowel message, wherein the sound energy of the low-frequency part of the normal voice vowel message is 1.5-1,000,000 times that of the low-frequency part of the vowel message.

BRIEF DESCRIPTION OF THE DRAWINGS

These and other objects and advantages of the present invention will become apparent from the following descriptions of the accompanying drawings, which disclose several embodiments of the present invention. It is to be understood that the drawings are to be used for purposes of illustration only, and not as a definition of the invention. In the drawings, wherein similar reference numerals denote similar elements throughout the several views.

DETAILED DESCRIPTION OF THE INVENTION

The following embodiments are provided in order to further explain the implementations of the present invention. It should be noted that the objects used in the diagrams of the embodiments are provided with proportions, dimensions, deformations, displacements and details as examples and that the present invention is not limited thereto; identical components in the embodiments are given the same component numbers.

Figure 1:
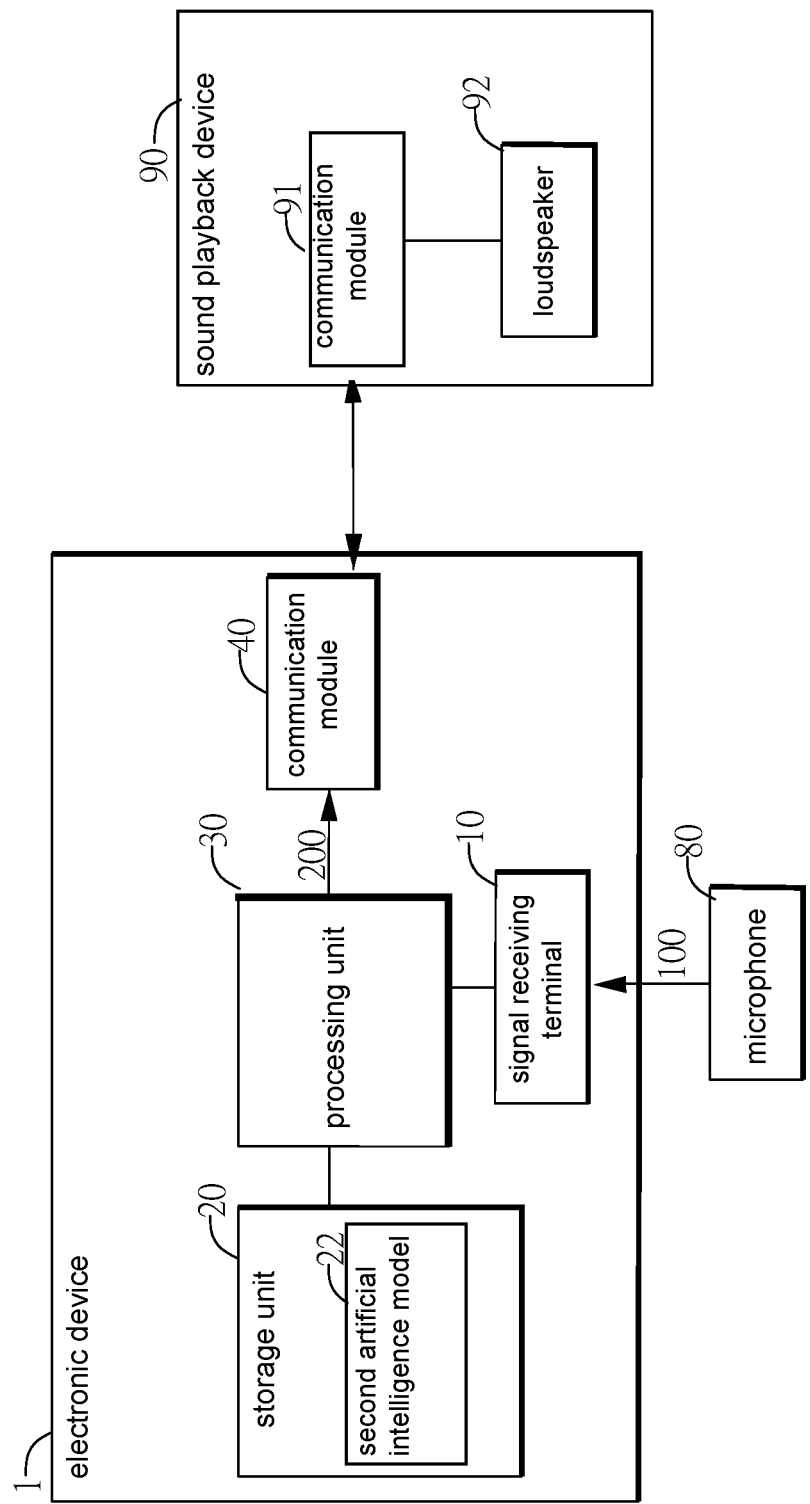
FIG. 1 is a schematic diagram showing the application environment of the first embodiment of the electronic device of the present invention.
Figure 2:
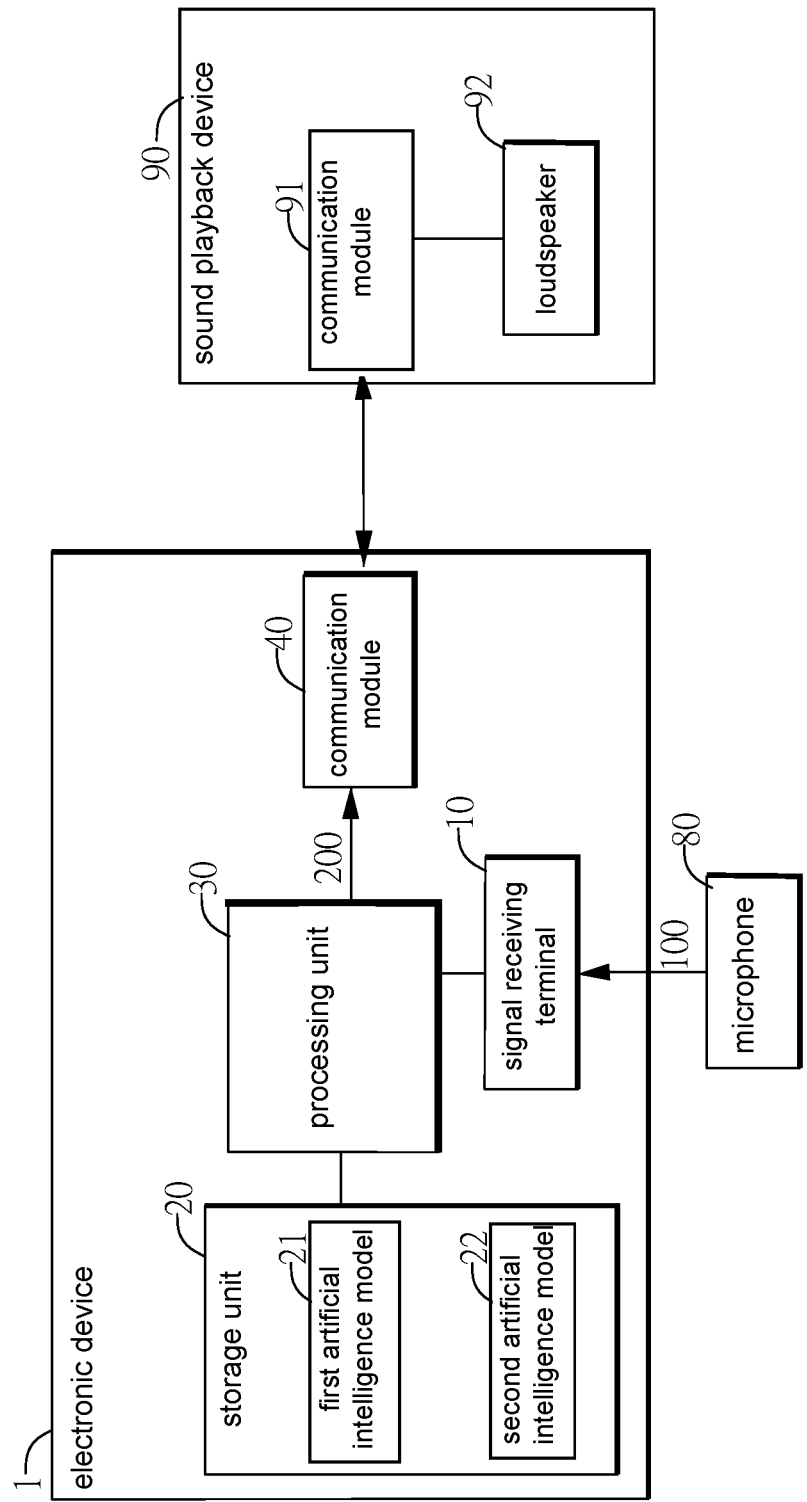
FIG. 2 is a schematic diagram showing the application environment of the second embodiment of the electronic device of the present invention.
Figure 3:
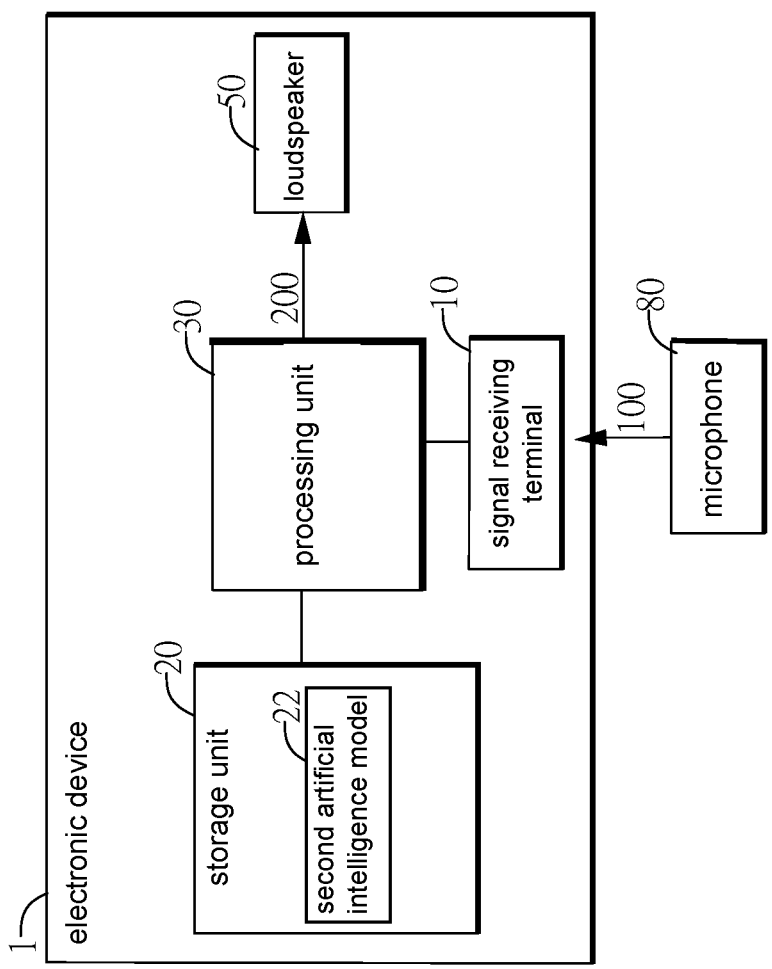
FIG. 3 is a schematic diagram showing the application environment of the third embodiment of the electronic device of the present invention.
Figure 4:
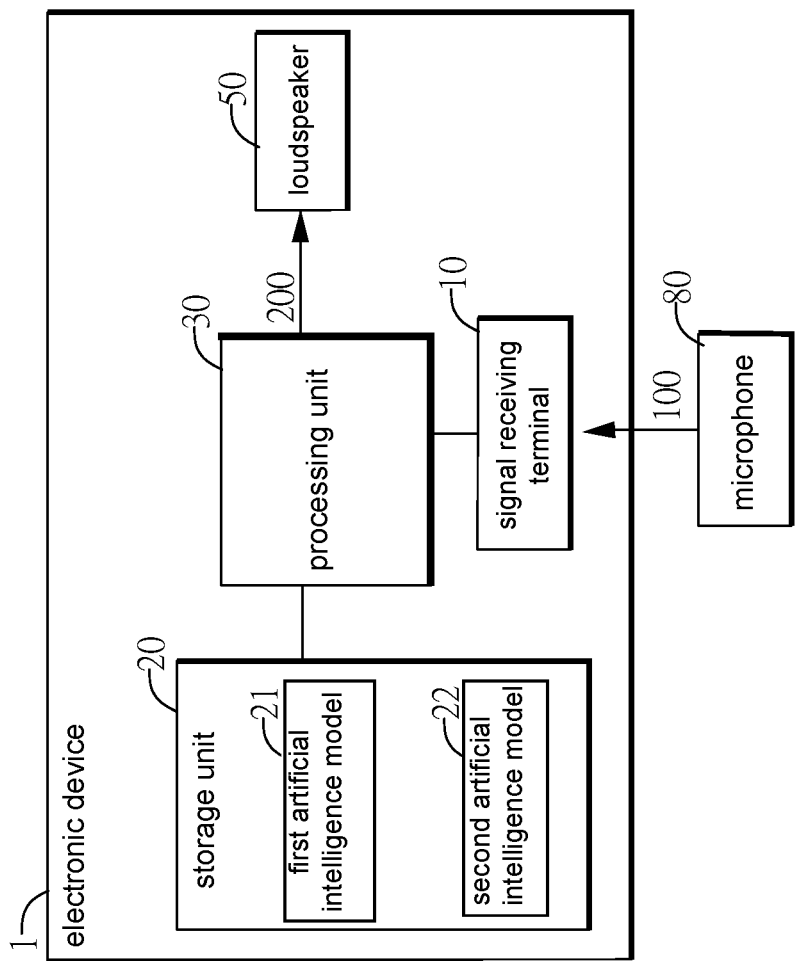
FIG. 4 is a schematic diagram showing the application environment of the fourth embodiment of the electronic device of the present invention.

Please refer to FIG. 1 to FIG. 4 first. FIG. 1 is a schematic diagram showing the application environment of the first embodiment of the electronic device of the present invention. FIG. 2 is a schematic diagram showing the application environment of the second embodiment of the electronic device of the present invention. FIG. 3 is a schematic diagram showing the application environment of the third embodiment of the electronic device of the present invention. FIG. 4 is a schematic diagram showing the application environment of the fourth embodiment of the electronic device of the present invention.

As shown in FIG. 1, in the first embodiment of the present invention, the electronic device 1 of the present invention can communicate with a sound playback device 90. The electronic device 1 comprises a signal receiving terminal 10, a storage unit 20, a processing unit 30, and a communication module 40. In the first embodiment of the present invention, the electronic device 1 may be a smart phone, but the scope of the present invention is not limited thereto.

In the first embodiment of the present invention, the signal receiving terminal 10 is used for receiving an audio message 100 from a microphone 80. More specifically, after receiving an outside sound, the microphone 80 can generate an audio message 100 and transmit the audio message 100 to the signal receiving terminal 10. However, it should be noted that the source of the audio message 100 described here is not limited to the microphone 80. For example, the audio message 100 may also be sent through a network, and the communication module 40 may receive the audio message 100 and then send the audio message 100 to the signal receiving terminal 10. The audio message 100 includes a vowel message and a consonant message. Generally, there are vowels and consonants in a language structure, and when speaking normally, the volume of the vowels is higher than that of the consonants. The vowel message as mentioned in the present invention refers to the vowel part of a voice message when the audio message contains the voice message of human speech, and the consonant message refers to the consonant part of the voice message.

In the first embodiment of the present invention, the storage unit 20 is used for storing a second artificial intelligence model 22.

In the first embodiment of the present invention, the processing unit 30 is coupled with the signal receiving terminal 10 and the storage unit 20. In a specific embodiment, the processing unit 30 and the storage unit 20 can be integrated into a microprocessor, but the scope of the present invention is not limited thereto. The processing unit 30 is used for determining whether the audio message 100 is a whispered voice message. In the first embodiment of the present invention, the processing unit 30 will detect the sound energy characteristics of the vowel message of the audio message. If the sound energy of the low-frequency part (frequency below 400 Hz) of the vowel message of the audio message 100 is X % of the sound energy of the entire vowel message, wherein 0.00000001≤X<4, the processing unit 30 will determine that the audio message 100 is a whispered voice message. When a person speaks in a whisper, the sound energy of the low-frequency part of a vowel accounts for a very small proportion of the sound energy of the whole vowel (i.e., all frequencies). Therefore, whether the audio message 100 is a whisper can be judged according to the proportion of the sound energy of the low-frequency part of the vowel to that of the whole vowel. Thus, in this embodiment, when the processing unit 30 detects that the sound energy of the low-frequency part of the vowel message of the audio message 100 is X % of the sound energy of the entire vowel message, wherein 0.00000001≤X<4, the processing unit 30 will determine that the audio message 100 is a whispered voice message. However, the method for judging whether a sound is whispered is not limited thereto. In addition to the method of using artificial intelligence described below, whether a sound is whispered can also be determined by detecting whether a sound wave of the vowel message of the audio signal 100 has resonance characteristics. If the processing unit 30 detects that the sound wave of the vowel message of the audio message 100 does not have resonance characteristics, the processing unit 30 will determine that the audio signal 100 is a whispered voice message. Since the detection of acoustic waveforms is an existing technology, it will not be described here.

Further, in the first embodiment of the present invention, the processing unit 30 can perform voice recognition by executing a second artificial intelligence model 22 to determine whether the audio message 100 is a sound made by a default user. In a specific embodiment, the second artificial intelligence model 22 can be generated by the existing artificial intelligence training mechanism; that is to say, the program parameters which can determine whether the audio message is made by a default user based on the timbre of the audio message can be generated by the existing artificial intelligence training mechanism. The processing unit 30 can execute the program parameters for voice recognition to accomplish the judgment of whether the audio message 100 is made by the default user. Since methods to train an artificial intelligence model to recognize sounds for specific voice recognition needs and realizing voice recognition through the trained artificial intelligence model are existing technologies, they will not be described here. In addition, it should be noted that the judgment of whether the audio message 100 is a sound made by the default user may not be necessarily realized by the execution of the second artificial intelligence model 22, and the judgment can also be realized by executing the existing voice recognition algorithm.

When the audio message 100 is determined to be a whispered voice message, the processing unit 30 will further output a normal voice message 200, wherein the output normal voice message 200 has the same voice content as the original audio message 100. Therefore, if the received audio message 100 includes a vowel message and a consonant message, the output normal voice message 200 will include a normal voice vowel message and a normal voice consonant message. The sound energy of the low-frequency part of the output normal voice vowel message is 1.5 to 1,000,000 times that of the low-frequency part of the vowel message, and the sound energy of the normal voice vowel message is 25-400% of the sound energy of the normal voice message 200; that is, the proportion of the sound energy of the vowel of the output sound will be significantly higher than that of the input sound.

Further, when it is determined that the audio message 100 is a sound made by the default user, the processing unit 30 will output the aforementioned normal voice message 200 according to the timbre of the default user's sound. That is to say, when the received audio message 100 is a whispered voice message and made by the default user, the processing unit 30 will not only adjust the output sound to a normal sound but also adjust the output sound according to the timbre of the default user's sound. However, if the audio message is a whispered voice message but is not made by the default user, it will only be adjusted to a default normal sound.

In the first embodiment of the present invention, the communication module 40 is coupled with the processing unit 30. The communication module 40 can communicate with the communication module 91 of the sound playback device 90 such that the output normal voice message 200 can be transmitted to the sound playback device 90 via the communication module 40. After receiving the normal voice message 200, the communication module 91 will transmit the normal voice message 200 to the loudspeaker 92 for playback.

As shown in FIG. 2, in the second embodiment of the present invention, the whispered voice message is not judged based on the sound energy characteristics of the vowel message but is judged by artificial intelligence voice recognition. Therefore, in the second embodiment of the present invention, unlike in the first embodiment, the electronic device 1 further comprises a first artificial intelligence model 21 stored in the storage unit 20, and the processing unit 30 performs voice recognition by executing the first artificial intelligence model 21 to accomplish the judgment of the whispered voice message. Similarly, since methods to train an artificial intelligence model to recognize voices for specific voice recognition needs and realizing voice recognition through the trained artificial intelligence model are existing technologies, they will not be described here. It should be noted that in other embodiments, the first artificial intelligence model 21 and the aforementioned second artificial intelligence model 22 can be the same artificial intelligence model; that is, the processing unit 30 can also execute a single artificial intelligence model to judge whether a sound is whispered and the default user's sound, and output the corresponding adjusted sound or directly output the received sound. For example, if an audio message 100 is received and the artificial intelligence model judges the received audio message 100 to be a whispered sound of a default user, the processing unit 30 will adjust and output the normal voice message 200 according to the timbre of the default user's sound. Further, if an audio message 100 is received and the artificial intelligence model judges the received audio message 100 to be a normal voice of a default user, the processing unit 30 will not adjust the audio message 100.

As shown in FIG. 3, in the third embodiment of the present invention, the electronic device 1 may be a hearing aid. Unlike the first embodiment of the present invention, the third embodiment of the electronic device 1 of the present invention further comprises a loudspeaker 50. The output normal voice message 200 will not be transmitted to the sound playback device 90 for playback but will be played on the loudspeaker 50 instead. Therefore, in this embodiment, when someone is whispering to a hearing-impaired person carrying the hearing aid, the hearing-impaired person can still clearly hear the content of the speech through the aforementioned output sound adjustment.

As shown in FIG. 4, in the fourth embodiment of the present invention, the difference from the third embodiment is that the judgment of whether a voice message is whispered is performed by executing artificial intelligence voice recognition. Therefore, as in the second embodiment, the electronic device 1 comprises a first artificial intelligence model 21 stored in the storage unit 20, and the processing unit 30 performs voice recognition by executing the first artificial intelligence model 21 to accomplish the judgment of whether a voice message is whispered. The output normal voice message is played on the loudspeaker 50.

Figure 5:
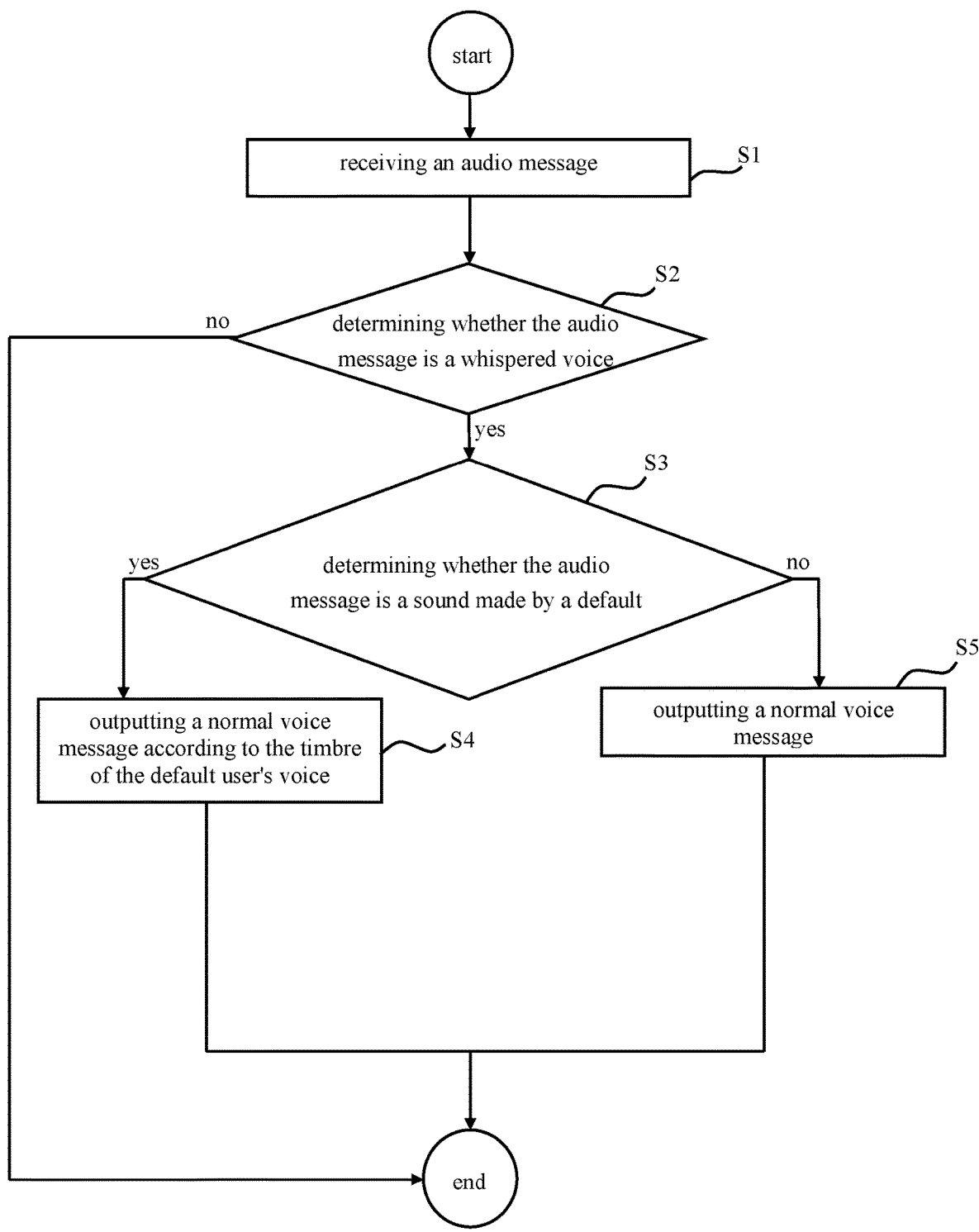
FIG. 5 is a flow chart showing the steps of one embodiment of the sound output adjustment method of the present invention.

Next, please refer to FIG. 5 which is a step flowchart of the adjustment method of sound output of the present invention. It should be noted here that the following description employs the electronic device 1 disclosed in FIG. 1 to FIG. 4 as an example to illustrate the adjustment method of sound output of the present invention. However, the scope of the adjustment method of sound output of the present invention is not limited to the electronic devices 1 described previously.

First is Step S1: receiving an audio message.

As shown in FIG. 1 to FIG. 4, in an embodiment of the present invention, the electronic device 1 receives an audio message 100 from the microphone 80 via the signal receiving terminal 10, wherein the audio message 100 includes a vowel message and a consonant message.

Perform Step S2: determining whether the audio message is a whispered voice message.

The adjustment method of sound output of the present invention increases the volume of the audio message when the input audio message is a whispered voice message such that the listener can hear the content of the voice message clearly. Therefore, after receiving the audio message 100, the processing unit 30 of the electronic device 1 will determine whether the audio message 100 is a whispered voice message.

In a specific embodiment, whether the audio message 100 is a whispered voice message is determined based on the sound energy of the vowel message of the audio message 100. When the sound energy of the low-frequency part (below 400 Hz) of the vowel message of the audio message 100 is X % of the sound energy of the entire vowel message, the audio message 100 is determined to be a whispered voice message, wherein $0.00000001 \leq X < 4$.

In another specific embodiment, whether the audio message 100 is a whispered voice message is determined based on the sound wave characteristics of the vowel message of the audio message 100. When the sound wave of the vowel message does not have resonance characteristics, the audio message 100 is determined to be a whispered voice message.

In another specific embodiment, whether the audio message 100 is a whispered voice message is determined by artificial intelligence technology. The determination of whether a voice message is whispered is accomplished by the processing unit 30 executing a first artificial intelligence model 21 for voice recognition.

Perform Step S3: determining whether the audio message is a sound made by a default user.

In Step S2, if it is determined that the audio message 100 is not a whispered voice message, the processing unit 30 will not make any adjustment to the audio message 100. In contrast, in one embodiment of the present invention, when the audio message 100 is determined to be a whispered voice message, the processing unit 30 will perform voice recognition by executing the second artificial intelligence model to determine whether the audio message 100 is a sound made by the default user. However, it should be noted that the execution of this step is not limited thereto. The judgment can also be accomplished by executing existing voice recognition algorithms.

Perform step S4: outputting a normal voice message according to the timbre of the default user's voice.

When it is determined that the audio message 100 is a whispered voice message and the sound is generated by the default user, the processing unit 30 will adjust the sound to be output according to the result of the determination. The output sound will be produced according to the timbre of the default user's sound, and the volume of the output sound will be increased. The output sound (i.e., normal voice message 200) has the same voice content as the audio message 100, and the low-frequency part of the vowel component (i.e., normal voice vowel message) of the output sound is 1.5-1,000,000 times that of the low-frequency part of the vowel component (i.e., vowel voice message) of the audio message 100. Moreover, the sound energy of the normal voice vowel message is Y % of the sound energy of the normal voice message, wherein $25 \leq Y \leq 400$.

Perform Step S5: outputting a normal voice message.

If it is determined that the audio message 100 is a whispered voice message but is not generated by the default user, the processing unit 30 will adjust only the volume and not the timbre of the output sound. As mentioned above, the output normal voice message 200 will have the same voice content as the audio message 100, and the sound energy of the low-frequency part (below 400 Hz) of the normal voice vowel message of the normal voice message 200 is 1.5-1,000,000 times that of the low-frequency part of the vowel message of the audio message 100.

It should be noted here that the sound output adjustment method of the present invention is not limited by the sequence of the above-mentioned steps. As long as the purpose of the present invention can be achieved, the above-mentioned sequence of steps can also be changed.

It can be seen from the above illustration that the adjustment method of sound output and the electronic device 1 of the present invention can detect whether the speaker's voice is normal or a whisper and can adjust the volume of the output sound if the speaker's voice is a whisper such that the listener can hear the speech clearly.

Although the invention has been explained in relation to its preferred embodiment, it is to be understood that many other possible modifications and variations can be made without departing from the spirit and scope of the invention as hereinafter claimed.

What is claimed is:

1. An adjustment method of sound output, which is applied to an electronic device, the adjustment method comprising the following steps:
    receiving an audio message, which comprises a vowel message having a sound energy;
    determining whether the audio message is a whispered voice message; and
    if so, outputting a normal voice message, wherein the normal voice message has the same voice content as the audio message and comprises a normal voice vowel message, and a sound energy of a low-frequency part of the normal voice vowel message is 1.5-1,000,000 times that of the low-frequency part of the vowel message,
    wherein when the sound energy of a low-frequency part of the vowel message is X % of the sound energy of the entire vowel message, the audio message is determined to be the whispered voice message, wherein $0.00000001 \leq X < 4$.

2. The adjustment method as claimed in claim 1, wherein in response to a sound wave of the vowel message not having resonance characteristics, the audio message is determined to be a whispered voice message.

3. The adjustment method as claimed in claim 1, wherein the sound energy of the normal voice vowel message is Y % of that of the normal voice message, wherein $25 \leq Y \leq 400$.

4. The adjustment method as claimed in claim 1, further comprising the following steps: determining whether the audio message is a sound made by a default user; and if so, outputting the normal voice message according to a timbre of the default user's voice.

5. The adjustment method as claimed in claim 4, wherein a judgment of whether the audio message is a sound made by the default user is performed by executing a second artificial intelligence module for voice recognition.

6. The adjustment method as claimed in claim 1, wherein a judgment of the whispered voice message is performed by executing a first artificial intelligence model for voice recognition.

7. The adjustment method as claimed in claim 6, further comprising the following steps: determining whether the audio message is a sound made by a default user; and if so, outputting the normal voice message according to the timbre of the default user's voice.

8. The adjustment method as claimed in claim 7, wherein the judgment of whether the audio message is a sound made by the default user is performed by executing a second artificial intelligence module for voice recognition.

9. The adjustment method as claimed in claim 6, further comprising the following steps: determining whether the audio message is a sound made by a default user by executing the first artificial intelligence model for voice recognition; and if so, outputting the normal voice message according to the timbre of the default user's voice.

10. An electronic device, comprising:
    a signal receiving terminal for receiving an audio message, wherein the audio message comprises a vowel message having a sound energy; and
    a processing unit, which is coupled to the signal receiving terminal and determines whether the audio message is a whispered voice message, and when the audio message is a whispered voice message, the processing unit outputs a normal voice message,
    wherein the normal voice message has the same voice content as the audio message and comprises a normal voice vowel message, wherein a sound energy of a low-frequency part of the normal voice vowel message is 1.5-1,000,000 times that of the low-frequency part of the vowel message,
    wherein when the sound energy of a low-frequency part of the vowel message is X % of the sound energy of the entire vowel message, the processing unit determines that the audio message is a whispered voice message, wherein $0.00000001 \leq X < 4$.

11. The electronic device as claimed in claim 10, wherein in response to a sound wave of the vowel message not having resonance characteristics, the processing unit determines that the audio message is a whispered voice message.

12. The electronic device as claimed in claim 10, wherein the sound energy of the normal voice vowel message is Y % of that of the normal voice message, wherein $25 \leq Y \leq 400$.

13. The electronic device as claimed in claim 10, wherein the processing unit further determines whether the audio message is a sound made by a default user, and when the audio message is a sound made by the default user, the processing unit outputs the normal voice message according to a timbre of the default user's voice.

14. The electronic device as claimed in claim 13, wherein the processing unit determines whether the audio message is a sound made by the default user by executing a second artificial intelligence model for voice recognition.

15. The electronic device as claimed in claim 10, wherein the processing unit performs a judgment of the whispered voice message by executing a first artificial intelligence model.

16. The electronic device as claimed in claim 15, wherein the processing unit further determines whether the audio message is a sound made by a default user, and when the audio message is a sound made by the default user, the processing unit outputs the normal voice message according to the timbre of the default user's voice.

17. The electronic device as claimed in claim 16, wherein the processing unit determines whether the audio message is a sound made by the default user by executing a second artificial intelligence model for voice recognition.

18. The electronic device as claimed in claim 15, wherein the processing unit further executes the first artificial intelligence model for voice recognition to determine whether the audio message is a sound made by a default user, and when the audio message is a sound made by the default user, the processing unit outputs the normal voice message according to the timbre of the default user's voice.

* * * * *